United States Patent
Jutte et al.

(10) Patent No.: US 11,441,998 B2
(45) Date of Patent: Sep. 13, 2022

(54) LASER SENSOR MODULE WITH INDICATION OF READINESS FOR USE

(71) Applicants: TRUMPF Photonic Components GmbH, Ulm (DE); Robert Bosch GmbH, Stuttgart (DE)

(72) Inventors: Petrus Theodorus Jutte, Eindhoven (NL); Okke Ouweltjes, Eindhoven (NL); Soren Sofke, Reutlingen (DE); Johannes Hendrikus Maria Spruit, Ulm (DE)

(73) Assignees: TRUMPF PHOTONIC COMPONENTS GMBH, Ulm (DE); ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/126,060

(22) Filed: Dec. 18, 2020

(65) Prior Publication Data
US 2021/0148807 A1    May 20, 2021

Related U.S. Application Data

(63) Continuation of application No. PCT/EP2019/065445, filed on Jun. 13, 2019.

(30) Foreign Application Priority Data

Jun. 21, 2018  (EP) .................................. 18179090

(51) Int. Cl.
  *G01N 15/14*   (2006.01)
  *G01N 15/06*   (2006.01)
  *G01N 21/15*   (2006.01)

(52) U.S. Cl.
  CPC ......... *G01N 15/1429* (2013.01); *G01N 15/06* (2013.01); *G01N 15/1434* (2013.01);
  (Continued)

(58) Field of Classification Search
  None
  See application file for complete search history.

(56) References Cited

U.S. PATENT DOCUMENTS

| 4,871,251 A | 10/1989 | Preikschat et al. |
| 2002/0167664 A1* | 11/2002 | Rettig ................ G01N 21/8507 356/338 |

(Continued)

FOREIGN PATENT DOCUMENTS

| DE | 102015207289 A1 | 10/2016 |
| JP | 2007022877 A | 2/2007 |

(Continued)

OTHER PUBLICATIONS

Giuliani, et al. "Laser Diode Self-Mixing Technique for Sensing Applications," Journal of Optics A: Pure and Applied Optics, Nov. 2002, S283-S294, 4, Institute of Physics Publishing, UK.

*Primary Examiner* — Rufus L Phillips
(74) *Attorney, Agent, or Firm* — Leydig, Voit & Mayer, Ltd.

(57) ABSTRACT

A laser sensor module measures a particle density of particles with a size of less than 20 μm. The laser sensor module includes: a laser configured to emit a laser beam; a detector; and an optical arrangement. The optical arrangement is configured to focus the laser beam to a focus region. The laser is configured to emit the laser beam through the optical arrangement to the focus region. The optical arrangement has an emission window. The detector is configured to determine an interference signal of an interference of reflected laser light with emitted later light of the laser beam. The laser sensor module is configured to provide an indication signal of a soiling of the emission window based on the interference signal determined during a mechanical excitation of the emission window.

15 Claims, 6 Drawing Sheets

(52) U.S. Cl.
CPC ..... *G01N 21/15* (2013.01); *G01N 2015/0693* (2013.01); *G01N 2021/157* (2013.01)

(56) References Cited

U.S. PATENT DOCUMENTS

| | | | |
|---|---|---|---|
| 2013/0271753 A1* | 10/2013 | Schmalz | G01N 21/8806 356/237.1 |
| 2014/0246611 A1* | 9/2014 | Sacquard | G01N 21/86 250/559.1 |
| 2016/0313243 A1* | 10/2016 | Dittrich | G01N 15/1434 |
| 2018/0154406 A1* | 6/2018 | Magee | G02B 27/0006 |
| 2020/0096314 A1* | 3/2020 | Ouweltjes | G01N 15/1456 |

FOREIGN PATENT DOCUMENTS

| | | | | |
|---|---|---|---|---|
| JP | 2007234666 A | * | 9/2007 | ......... G01B 11/0625 |
| JP | 2012525578 | * | 10/2012 | |
| WO | WO 9110123 A1 | | 7/1991 | |
| WO | WO 0237410 A1 | | 5/2002 | |
| WO | WO-2014026907 A1 | * | 2/2014 | ............. G01N 21/15 |
| WO | WO-2017017282 A1 | * | 2/2017 | ........ G01N 15/0205 |
| WO | WO-2017060105 A1 | * | 4/2017 | ............ G01N 15/1459 |
| WO | WO-2017198555 A1 | * | 11/2017 | ............. G01N 15/06 |
| WO | WO 2017198555 A1 | | 11/2017 | |

\* cited by examiner

LASER SENSOR MODULE WITH INDICATION OF READINESS FOR USE

CROSS-REFERENCE TO PRIOR APPLICATIONS

This application is a continuation of International Patent Application No. PCT/EP2019/065445, filed on Jun. 13, 2019, which claims priority to European Patent Application No. EP 18179090.8, filed on Jun. 21, 2018. The entire disclosure of both applications is hereby incorporated by reference herein.

FIELD

The invention relates to a laser sensor module with an indication of readiness for use and a particle detector or a mobile communication device comprising the laser sensor module. The invention further relates to a method of testing readiness for use of the laser sensor module and a corresponding computer program product.

BACKGROUND

DE 10 2015 207 289 A1 discloses a particle sensor apparatus having an optical emitter device that is configured to emit an optical radiation so that a volume having at least one particle possibly present therein is at least partly illuminable; an optical detector device having at least one detection surface that is struck by at least a portion of the optical radiation scattered at the at least one particle, at least one information signal regarding an intensity and/or an intensity distribution of the optical radiation striking the at least one detection surface being displayable; and an evaluation device with which an information item regarding a presence of particles, a number of particles, a particle density, and/or at least one property of particles is identifiable and displayable, the particle sensor apparatus also encompassing at least one lens element that is disposed so that the emitted optical radiation is focusable onto a focus region inside the volume.

U.S. Pat. No. 4,871,251 A discloses an apparatus for analyzing particles contained in a fluent medium. The apparatus has a body having a window, an optical source comprising a laser diode and an optical system for focusing the light from the laser diode at a focal spot. A photodetector is mounted in the body and detects light backscattered from the focal spot by particles in the fluent medium.

JP 2007-022877 A discloses a glass-particle deposition method using an opto-acoustic technique for controlling the thickness of the sedimentary glass-particle layers deposited.

WO 91/10123 A1 discloses a particle detection device and method, wherein a laser is applied on the side of a channel which is traversed by a medium. The laser light passes across the channel. Particles within the channel deflect the laser light, thus creating forward directed light cones. The light cones are refracted outside the channel and thereafter hit a detector plate in form of light rings.

SUMMARY

An embodiment of the present invention provides a laser sensor module that measures a particle density of particles with a size of less than 20 μm. The laser sensor module includes: a laser configured to emit a laser beam; a detector; and an optical arrangement. The optical arrangement is configured to focus the laser beam to a focus region. The laser is configured to emit the laser beam through the optical arrangement to the focus region. The optical arrangement has an emission window. The detector is configured to determine an interference signal of an interference of reflected laser light with emitted later light of the laser beam. The laser sensor module is configured to provide an indication signal of a soiling of the emission window based on the interference signal determined during a mechanical excitation of the emission window.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
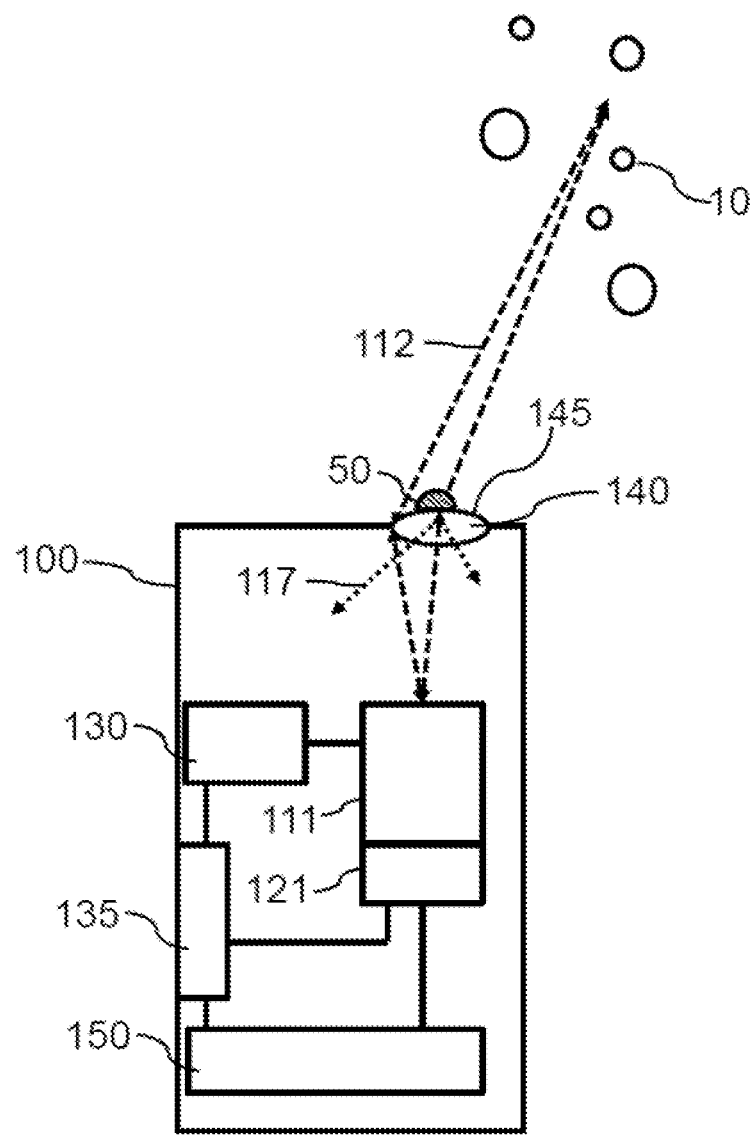
FIG. 1 shows a principal sketch of a first embodiment of a laser sensor module.

Embodiments of the present invention provide a laser sensor module with increased reliability.

According to a first aspect, a laser sensor module for measuring a particle density of particles with a size of less than 20 μm, preferably less than 10 μm in a fluid is provided. The laser sensor module may especially be suited to measure the particle density of particles with a size between 0.05 μm to 10 μm, preferably between 0.1 μm and 2.5 μm (e.g. PM 2.5). The laser sensor module comprises a laser, a detector, and an optical arrangement for focusing the laser beam to a focus region. The laser is arranged to emit a laser beam through or via the optical arrangement to the focus region, wherein the optical arrangement comprises an emission window. The detector is arranged to determine an interference signal. The interference signal is preferably a self-mixing interference signal of an optical wave within a laser cavity of the laser. The interference signal or self-mixing interference signal may be generated by laser light of the laser beam reflected by at least one of the particles. The laser sensor module is arranged to provide an indication signal of a soiling of the emission window based on an interference signal or a self-mixing interference signal determined during a mechanical excitation of the emission window. The laser sensor module may comprise two, three, four, or more lasers and corresponding detectors. The laser beams emitted by the different laser are preferably inclined with respect to each other.

The emission window is mechanically decoupled from the laser and/or detector and/or at least a part of the optical arrangement such that a relative movement of the emission window with respect to the laser and/or detector and/or at least a part of the optical arrangement is enabled. The mechanical decoupling enables detection of the soiling because of the interference signal or self-mixing interference signal caused by laser light reflected by the soiling during the defined relative movement of the soiling with respect to the detecting parts (laser, detector) of the laser sensor module caused by the mechanical excitation.

Experiments have shown that detection of particle densities by means of laser sensor module based on interference and especially self-mixing interference measurements is sensitive with respect to a soiling of the emission window through which the laser beam or laser beams are emitted. The soiling or pollution of the emission window may reduce intensity of the emitted laser light and the back reflected laser light (causing two times corresponding transmission losses). Furthermore, the pollution may influence the spot quality as well. Both effects result in an undesired reduction of detected particle concentration. The soiling or pollution of the emission window causes scattering of the laser light. Part of this scattered laser light will be reflected back into, for example, the laser cavity of the respective laser. The more pollution, the more laser light will be reflected towards laser cavity. This reflected laser light just will give rise in a minor DC power change of the laser output, which also depends on the phase difference of the reflected laser light with respect to the standing wave pattern in the laser cavity. Consequently, the scattered light from the pollution or soiling cannot be used in a straightforward way to detect the soiling using interference or self-mixing interference. Experiments have shown that path length variations of the reflected laser light will occur if the emission window is moving with respect to the laser or lasers. These path length variations will give rise to a Doppler signal in the interference or self-mixing interference signal, which can be detected with high sensitivity. The displacements of the emission window may be a relative small. The Doppler frequency for a movement direction of the window in vertical direction is given by:

$$f_D = \frac{2v}{\lambda} * \cos(\alpha)$$

with v the velocity, $\lambda$ the wavelength and $\alpha$ the angle of the beam with respect to the normal of the window. As an example, a 20 kHz Doppler frequency is obtained for a velocity of 1 cm/s. This frequency can be well detected. Further experiments have shown that the signal strength of the detected Doppler frequency depends on the soiling of the emission window. It is therefore possible to get a quantitative indication signal caused by the soiling on the moving emission window if the interference or self-mixing interference signal is determined during a mechanical excitation of the emission window. The latter is especially interesting in applications in which mechanical stimulators are already available such as, for example, mobile communication devices (vibration alert, loudspeakers etc.). The mechanical stimulator may be used to provide a defined mechanical excitation of the emission window (e.g. cover glass of the mobile communication device) which can be used to determine the soiling or pollution of the emission window. The quantitative indication signal may be used to inform a user of the laser sensor module that the laser sensor module is not ready for use (reliability of detected particle density is reduced) due to the soiling of the emission window and/or the measurement result may be corrected depending on the level of soiling of the emission window. The compensation or correction may be related to the count rate (number of particles per time unit) and/or particle size.

The interference signal may especially be a self-mixing interference signal as described above. The laser sensor module may comprise an evaluator. The evaluator is arranged to determine the soiling of the emission window based on the self-mixing interference signal determined during mechanical excitation of the emission window. The laser sensor module is arranged to generate the indication signal of the soiling of the emission window after determining the soiling of the emission window.

The indication signal (e.g. generated by the detector or evaluator) may enable determination of a quantitative measure of the soiling of the emission window. The laser sensor module may be arranged to correct a measured particle density based on the determined quantitative measure of the soiling. The quantitative measure of the soiling of the emission window may enable determination of corresponding transmission losses due to scattering of laser light. Determination of the particle density may therefore be calculated based on the reduced intensity of the emitted and reflected laser light.

The mechanical stimulation may be provided manually (e.g. shaking the laser sensor module or knocking with a finger) or by means of a mechanical stimulator.

The laser sensor module may, for example, comprise such a mechanical stimulator. The mechanical stimulator is arranged to mechanically excite the emission window upon reception of an excitation control signal. The mechanical stimulator may be arranged to provide a mechanical excitation of the whole laser sensor module or a local mechanical excitation of the emission window (e.g. by means of miniaturized piezo actuators).

The laser sensor module may comprise an interface. The laser sensor module is arranged to receive the excitation control signal via the interface. The interface may be a wired or wireless interface. The excitation control signal may, for example, be provided by an external device or a device comprising the laser sensor module.

The laser sensor module may alternatively or in addition be arranged to generate the excitation control signal. The evaluator may, for example, comprise a corresponding control function or the laser sensor module may comprise a dedicated controller to generate the excitation control signal.

The optical arrangement may comprise an optical device for focusing the laser beam to the focus region. One surface of the optical device may comprise the emission window. The emission window may, for example, be an outer surface of a lens. The emission window may alternatively be physically separated from the optical device (e.g. cover glass covering the optical device).

A device like a particle detector, air cleaner, ventilation hood, or a wearable device, like a mobile communication device and the like, may comprise the laser sensor module according to any embodiment described above. The device may comprise an indicator. The indicator is arranged to provide an indication of the soiling to a user of device based on the indication signal. The indicator may comprise any kind of interface that is suited to inform the user. The indicator may, for example, comprise a loudspeaker or a display. The indicator may, for example, be a display of a mobile communication device. The indicator may, for example, present a corrected particle density based on the indication signal to the user wherein the corrected particle density may, for example, be colored green (no relevant soiling), yellow or red (critical soiling) depending on the level of soiling of the emission window. The indicator may alternatively be a visible, audible, or haptic signal indicating that the emission window is soiled or polluted in a critical way.

The electrical motor of, for example, an air cleaner or ventilation hood may be used as mechanical stimulator (e.g. switching on and of the predetermined time intervals or changing power settings of the respective electrical motor in predetermined time intervals).

The device may be arranged to initiate the mechanical excitation of the emission window. A haptic feedback generator, vibration alert, loudspeaker, and the like may be used to initiate the mechanical excitation. The device may initiate the mechanical excitation in regular time intervals or each time the particle detection functionality is switched on.

The device may be arranged to determine the soiling of the emission window based on the interference signal or self-mixing interference signal determined during the mechanical excitation of the emission window. The raw data measured by means of the detector may be transferred to the device via an interface. The device may especially be arranged to determine a quantitative measure of the soiling of the emission window based on the indication signal. The device may further be arranged to correct a measured particle density based on the determined quantitative measure of the soiling as described above. The device may comprise an evaluator to determine the quantitative measure based on the raw data provided by the laser sensor module.

According to a further aspect a method of testing a soiling of an emission window of a laser sensor module for measuring a particle density of particles with a size of less than 20 µm, preferably less than 10 µm in a fluid is presented. The method comprises the steps of:

emitting a laser beam through an emission window to a focus region, mechanically exciting the emission window during emission of the laser beam for determining the soiling, and determining an interference signal during mechanical excitation of the emission window.

The method may comprise the additional step of:

providing an indication signal of the soiling of the emission window based on the self-mixing interference signal determined during the mechanical excitation of the emission window.

According to a further aspect, a computer program product is presented. The computer program product comprises code means, which can be saved on at least one memory device of the laser sensor module or on at least one memory device of a device comprising the laser sensor module. The code means being arranged such that the method according to embodiments described above can be executed by means of at least one processing device of the laser sensor module or by means of at least one processing device of the device comprising the laser sensor module.

The memory device or the processing device may be comprised by the laser sensor module (e.g. electrical driver, evaluator etc.) or the device comprising the laser sensor module. A first memory device and/or first processing device of the device comprising the particle detector may interact with a second memory device and/or second processing device comprised by the laser sensor module.

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

Further advantageous embodiments are defined below.

These and other aspects of the invention will be apparent from and elucidated with reference to the exemplary embodiments described hereinafter.

In the Figures, like numbers refer to like objects throughout. Objects in the Figures are not necessarily drawn to scale.

Various embodiments of the invention will now be described by means of the Figures.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410, which is incorporated by reference. The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser, and thus, in the intensity of radiation emitted by the laser, and it is this phenomenon which is termed the self-mixing effect in a diode laser.

The change in intensity of the radiation emitted by the laser or of the optical wave in the laser cavity can be detected by a photo diode or a detector arranged to determine an impedance variation across the laser cavity. The diode or impedance detector converts the radiation variation into an electric signal, and electronic circuitry is provided for processing this electric signal.

The self-mixing interference signal may, in case of particle detection, for example, be characterized by a short signal burst or a number of signal bursts. The Doppler frequency as observed in these signals is a measure for the particle velocity along the optical axis. It may therefore be preferred to use a DC drive current in order to simplify signal detection and signal analysis. A modulated drive current may be used in order to determine the position or velocity of the particle, for example, by means of self-mixing interference signals, which may be generated by reflection of laser light at bigger particles or disturbing objects. The distance (and optionally velocity) may be determined within one measurement or in a subsequent measurement step. It may therefore be possible, or even beneficial, to use a DC drive current in a first period in time in order to generate a particle measure of the intended particle number, velocity, and a modulated drive current in order to determine false objects in the beam. The duration and the intensity of the signal may optionally be used to determine the particle size.

Interference measurements for particle detection may further be performed by means of a miniaturized interferometer comprising an external detector arranged to measure interference of emitted and reflected laser light along interference paths outside the laser cavity.

FIG. 1 shows a principal sketch of a first embodiment of a laser sensor module 100. The laser sensor module 100 comprises three lasers 111 and corresponding detectors 121 to detect an interference signal. Only one laser 111 and one detector 121 is shown in FIG. 1 to simplify the discussion. In the following it is thus referred to the laser 111 and corresponding detector 121 shown in FIG. 1. The laser sensor module 100 further comprises an electrical driver 130 which is arranged to supply an electrical drive current to the laser 111 such that the laser emits a laser beam 112 upon reception of the electrical drive current. The detector 121 is a photo diode integrated in the laser 111 to determine a self-mixing interference signal in a laser cavity of the laser 111. The detector 121 may according to an alternative embodiment be a separate photo diode arranged to receive an interference signal based on the interference of emitted and reflected laser light.

The laser 111 is arranged to emit laser light to an optical arrangement 140 which comprises in this case a lens. The outer surface of the lens comprises the emission window 145 of the laser sensor module 100. The lens focusses the laser beam 112 to a focus region. Particles 10 in the focus region reflect a part of the laser light back to the lens and finally to the laser cavity of the laser 111 resulting in a self-mixing interference of the standing wave pattern in the laser cavity and the reflected laser light.

The corresponding self-mixing interference signal is detected by means of the detector 121 and a corresponding measurement signal is transmitted to an interface 135 and evaluator 150 comprised by the laser sensor module 100. The evaluator is arranged to receive via the interface 135 a signal that a mechanical excitation is provided to the laser sensor module 100 and especially the lens. The evaluator 150 further receives an indication signal from the detector 121 during mechanical excitation of the laser sensor module 100. The indication signal comprises a measurement signal caused by scattered laser light 117 scattered by a dirt particle 50 on the emission window 145 during mechanical excitation of the laser sensor module 100.

The lens and therefore the emission window 145 is mechanically decoupled from the laser 111 and the detector 121 (e.g. embedded in a rubber mounting) such that the mechanical excitation causes a small relative movement between the emission window 145 and the laser 111 respectively the detector 121. The evaluator 150 determines a quantitative measure of the soiling or pollution of the emission window 145 by means of the dirt particle 50 based on the indication signal. The quantitative measure of the soiling is transferred to the interface 135 such that an external device can determine a particle density based on measurement signal determined by the detector 121 and the quantitative measure received from the evaluator 150.

Figure 2:
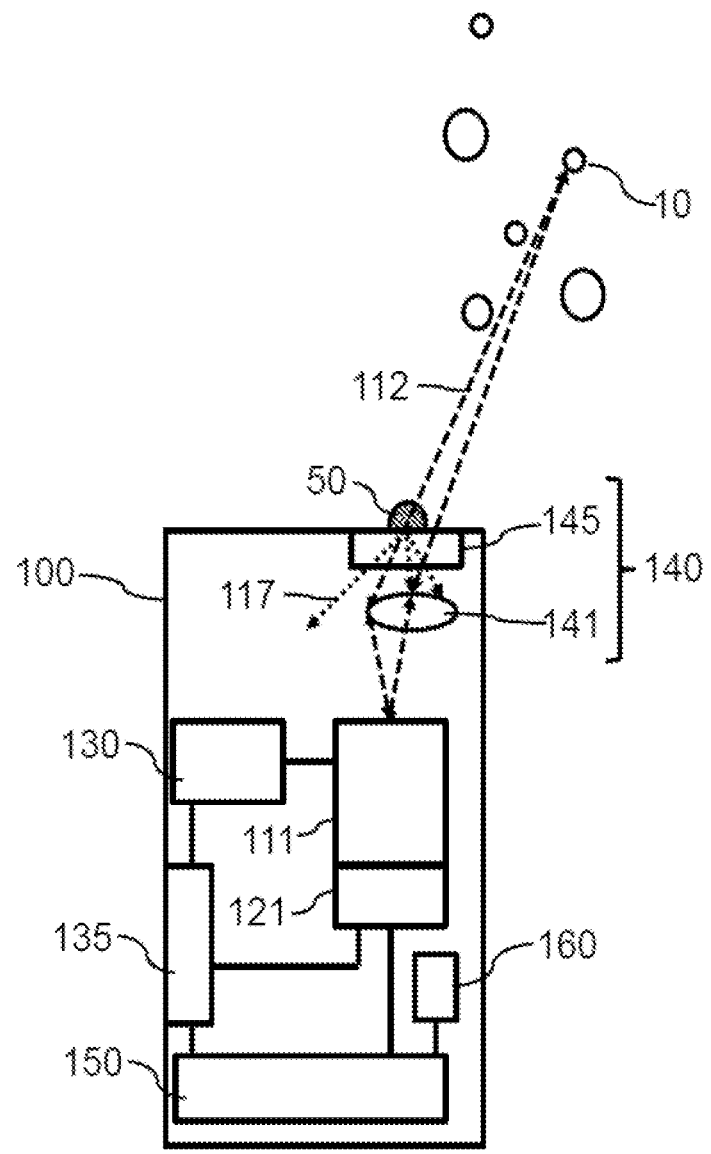
FIG. 2 shows a principal sketch of a second embodiment of a laser sensor module.

FIG. 2 shows a principal sketch of a second embodiment of a laser sensor module 100. The general configuration is very similar as discussed with respect to FIG. 1. The main differences are that the laser sensor module 100 comprises a mechanical stimulator 160 to provide the mechanical excitation and that the optical arrangement comprises an optical device 141 for focusing the laser beam 112 and a separate emission window 145 for protecting the optical device 141.

The separate emission window 145 is in this embodiment mechanically decoupled with respect to the optical device 141, the laser 111 and the detector 121 to enable a relative movement between the separate emission window 145 and optical device 141, the laser 111 and the detector 121. The separate emission window 145 may, for example, be comprised by a mobile communication device 190 described with respect to FIG. 7 below.

The optical device 141, the laser 111 and the detector 121 may in this case be arranged in a common package mounted on a PCB, wherein the separate emission window 145 may, for example, be a part of a cover glass covering the display of the mobile communication device 190. The evaluator 150 is in this second embodiment arranged to initiate mechanical excitation by means of the mechanical stimulator 160 to determine a soiling of the emission window 145 (dirt 50). The evaluator 150 is further arranged to determine a particle density based on the measurement results received from the detector 121 and a corrected particle density based on the measurement results received from the detector 121 and evaluation of the indication signal received during mechanical excitation of the laser sensor module 100 by means of the mechanical stimulator 160. The evaluator 150 is finally arranged to generate an error signal if the indication signal shows that the measurement signals provided by the detector 121 are not reliable because of the soiling of the emission window 145.

Figure 3:
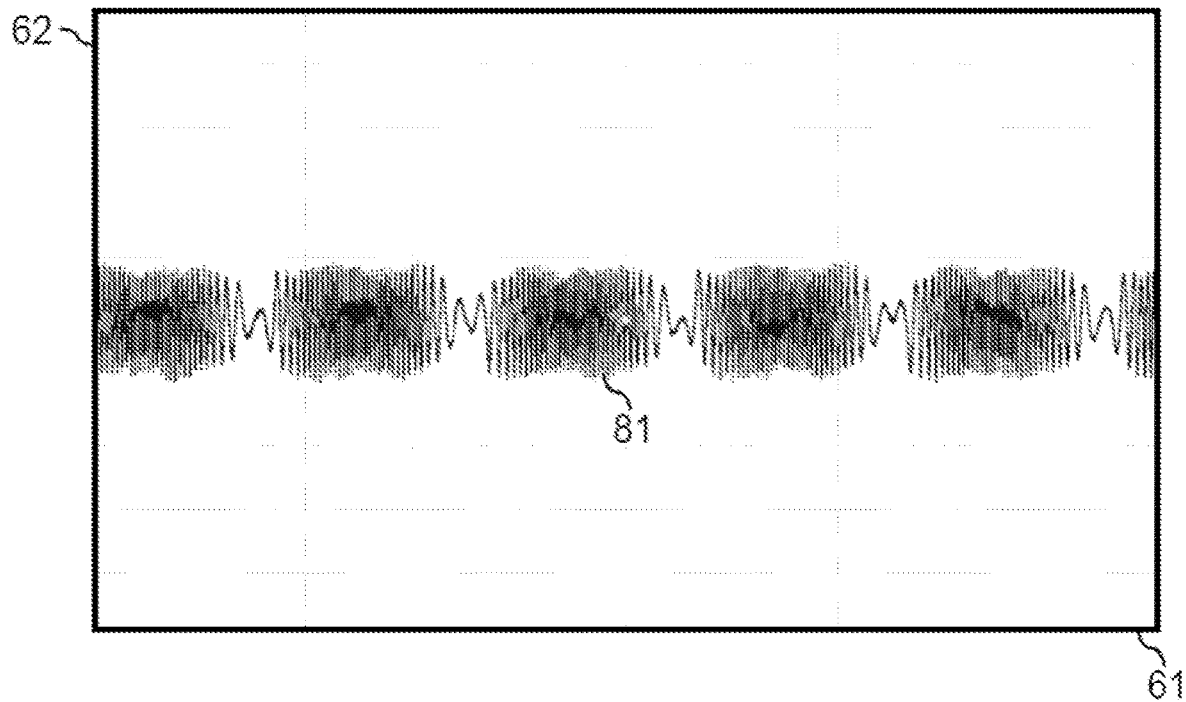
FIG. 3 shows first measurement results.

FIG. 3 shows first measurement results in which the emission window of the laser sensor module 100 was covered by a white tape inhibiting measurement of particle densities. The laser sensor module 100 comprising three lasers 111 and corresponding detectors 121 was integrated in a mobile communication device 190. A mechanical stimulator 194 comprised by the mobile communication device 190 was used to provide mechanical excitation of the laser sensor module 100.

FIG. 3 shows the signal amplitude 62 in arbitrary units as a function of time 61 of the indication signal 81 caused by the white tape of one single laser 111 and corresponding detector 121. The repetition time of sinusoidal movement of the emission window is about 8 ms. At the turning points, the Doppler frequency of the indication signal 81 goes to 0 Hz. In between the turning points, the velocity of the emission window with respect to the laser 111 is largest, and the Doppler frequency is above 10 KHz.

FIG. 3 shows that for white tape, giving large back reflections, the Doppler signals are easily detected. The amplitude Δ of the cover glass movement can be calculated by number of waves between the turning points m.

$$\Delta = \frac{m\lambda}{2\cos(\alpha)}$$

The amplitude is approximately 8 μm.

Figure 4:
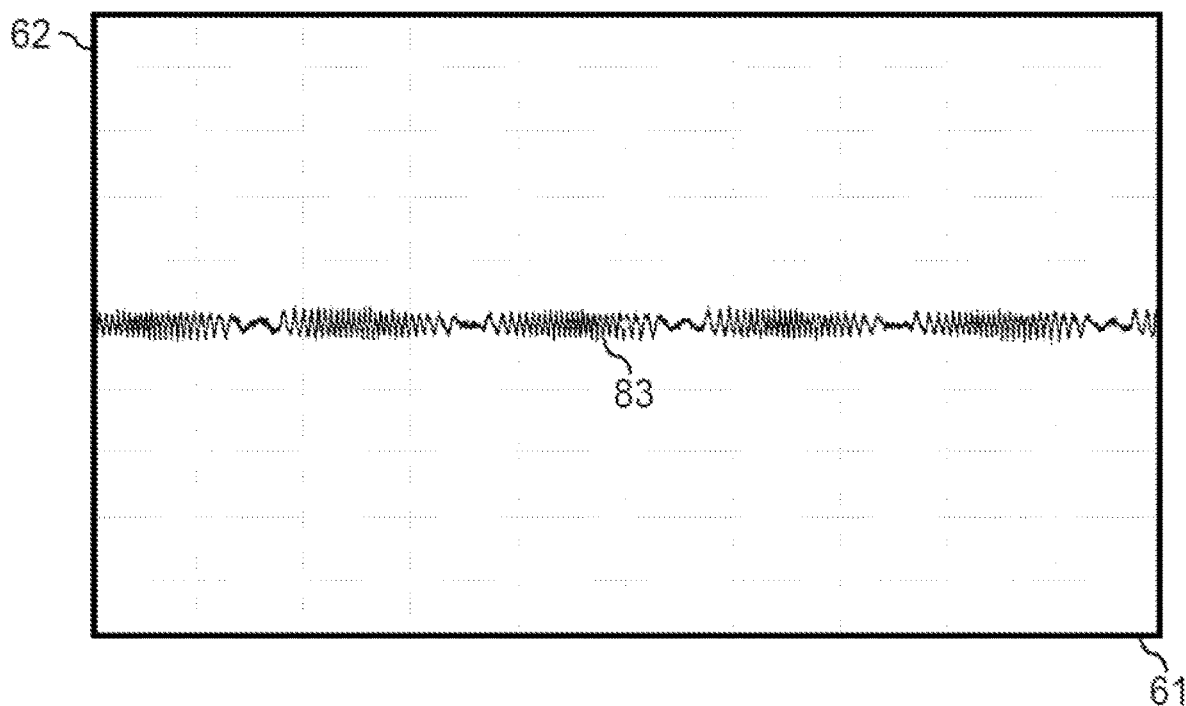
FIG. 4 shows second measurement results.

FIG. 4 shows second measurement results caused by a fingerprint on the cover glass of the mobile communication device 190, which builds the emission window 145 of the laser sensor module 100. The indication signal 83 caused by the fingerprint is smaller than the indication signal 81 caused by the white tape discussed above, as expected. The indication signal 83 is still easily detectable to enable a quantitative measure of the soiling of the emission window 145 (fingerprint).

Figure 5:
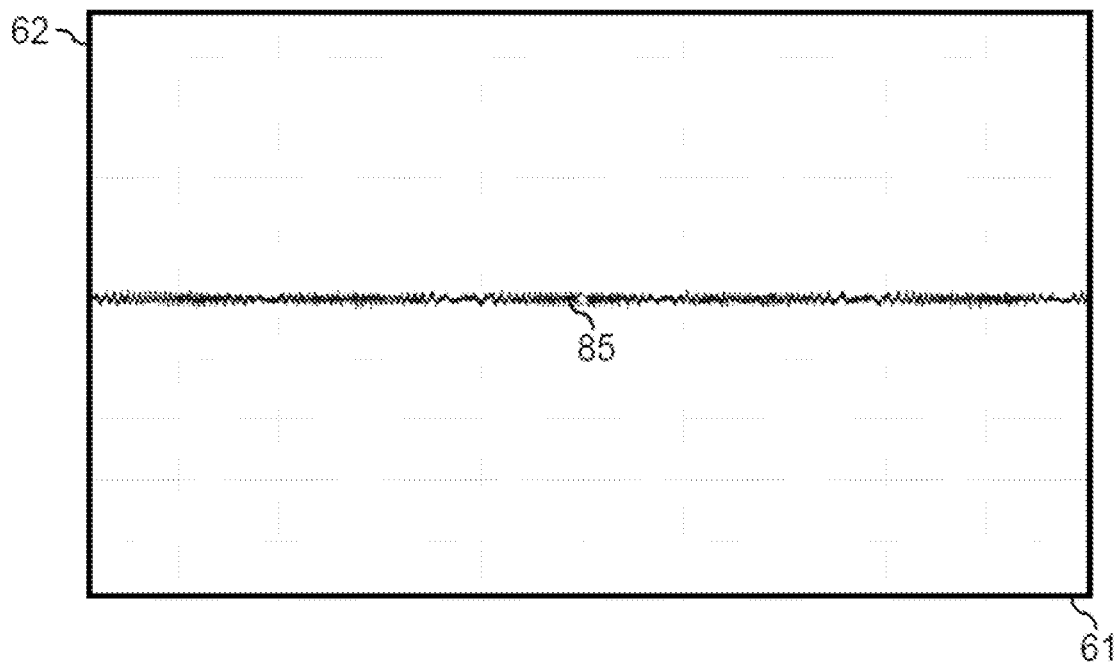
FIG. 5 shows third measurement results.

FIG. 5 shows third measurement results in which the emission window 145 is cleaned but the mechanical excitation by means of the mechanical stimulator 194 is still provided. The measurement signal 85 shows that minor signals are still present, and when looking carefully, distortion from the sinusoidal patterns is still visible. These signals may be caused by a combination of minor reflections from the emission window 145 (scratches, inclusions, imperfections) in combination with interference effects of some light which is retro-reflecting to the laser 111 via the emission window 145 and a PCB used for mounting and connecting the laser 111 and detector 121. Soiling of the emission window 145 by means of, for example, a fingerprint results in a frequency fD, while the light coming back from the PCB results in a frequency 2fD because the distance variation is doubled in this case. Superposition of fD and 2fD in combination with the noise level of the system itself (see also FIG. 6) results in the distorted signals. Optical simulations have shown that the amplitude of this "retroreflector effect" depends on the distance between optical device 141 (lens) and emission window 145 (cover glass) and on the exact design of the laser sensor module 100. An optimized design may therefore enable reduction of such retroreflector effects.

Figure 6:
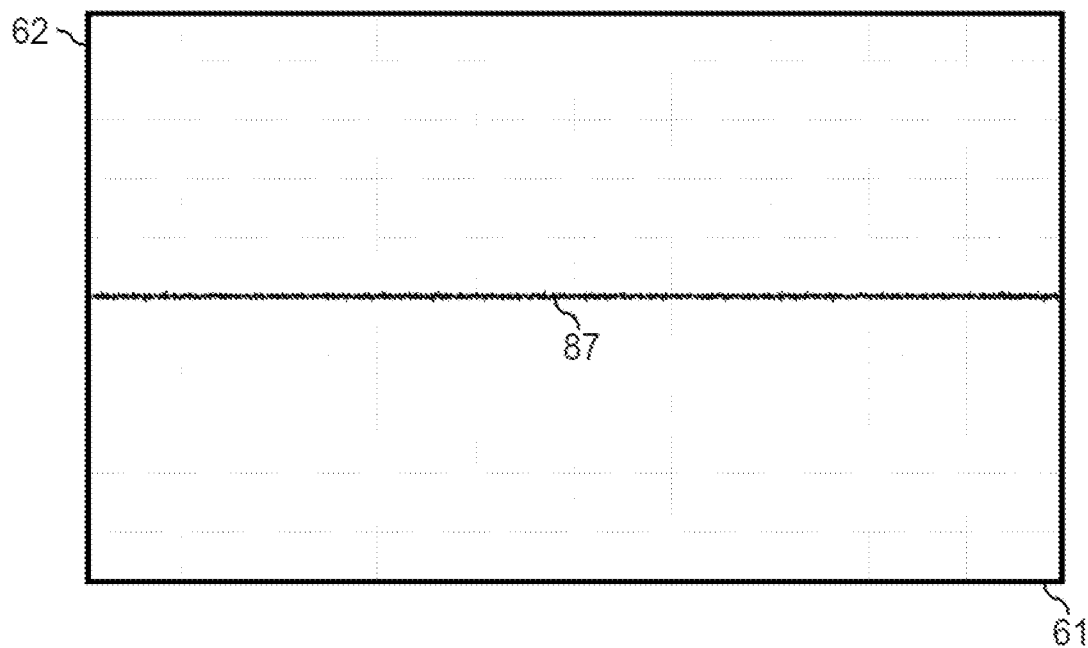
FIG. 6 shows fourth measurement results.

FIG. 6 shows fourth measurement results in which the mechanical stimulator 194 is switched off. The signal without mechanical excitation 87 shows the noise floor level of the laser sensor module. The same signal is observed when the mechanical stimulator 194 is switched on and the emission window is removed, as expected.

By studying the self-mixing interference signals and/or the number of detected particles with mechanical stimulator 160, 194 on, as compared to the normal situation with the mechanical stimulator 160, 194 off, a measure is obtained for the soiling of the emission window 145. When this measure is above a certain threshold, the user can be warned. This measure for soiling of the emission window 145 can also be used to make a correction of the measured PM 2.5 value to an estimated real value as discussed above.

In a laser sensor module 100 comprising more than one laser 111 and detector 121 (measurement channel) the correlation between the signals of a multi-channel (typically 3 measurement channels) laser sensor module 100 can be used to identify whether the emission window 145 (e.g. cover glass) contains contamination. Normally with a clean cover glass, the signals of each detector 121 are uncorrelated, as each measurement channel has its own noise statistic and the same particle 10 is because of the inclination between the laser beams 112 never seen by two or more detectors simultaneously, hence the measurement signals are uncorrelated. In case of contamination on the cover glass, the signals are correlated. This can be used to distinguish indication signals caused by soiling of the emission window 145 from real particle signals. Simple recursive algorithms and more sophisticated FFT based signal processing algorithms can be used to estimate the correlation, hence providing a qualitative and especially quantitative measure of the soiling of the emission window.

Periodic components caused by the mechanical stimulator 160, 194 may be suppressed by means of signal processing. For example, an adaptive filter that is configured as an adaptive periodic interference canceller could be used, which models the periodic components such as shown in FIG. 4 and cancels the slowly varying constant periodic components from the indication signal. The coefficients in this canceller can also be used to realize a fingerprint detector. Advantage of using such a canceller is that the particle detection can continue during mechanical stimulation of the emission window 145. The indication signal can therefore be used in a first step to provide quantitative measure of the soiling of the emission window 145 and in a second step after filtering the periodic components caused by mechanical stimulation to determine the particle density.

Figure 7:
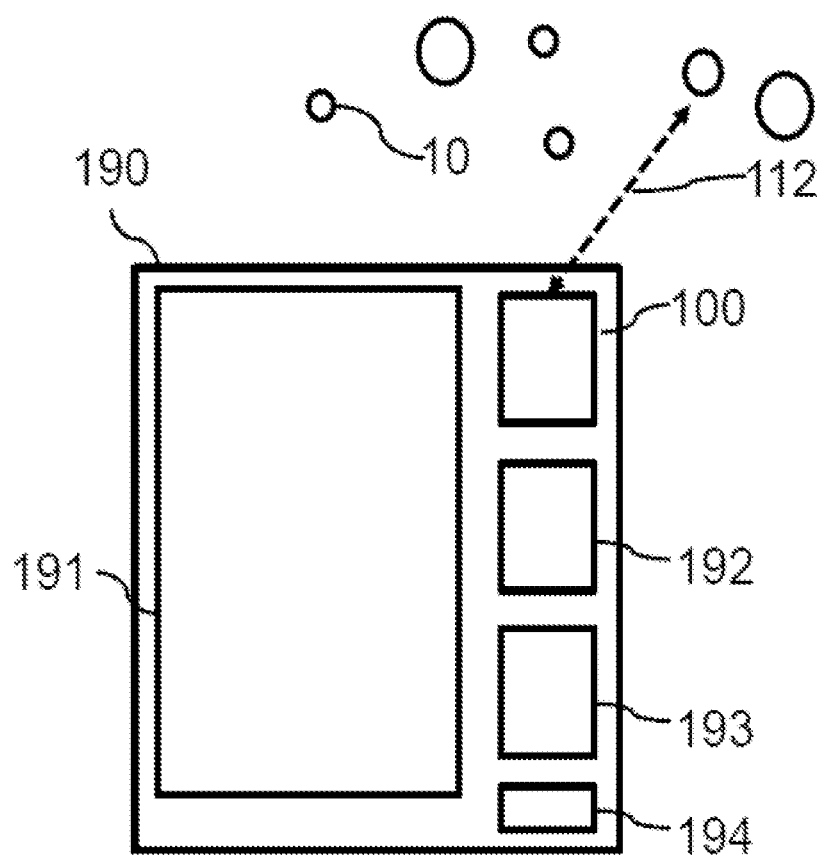
FIG. 7 shows a principal sketch of a mobile communication device.

FIG. 7 shows a principal sketch of a mobile communication device 190 comprising a laser sensor module 100. The laser sensor module 100 is adapted to emit a laser beam 112. The mobile communication device 190 comprises a user interface 191, a main processing device 192, and a main memory device 193. The main processing device 192 is connected with the main memory device 193 and with the laser sensor module 100. The main processing device 192 comprises at least a part of the functionalities of the evaluator 150 which are described above. The main processing device 192 stores data related to particle detection in the main memory device 193. In an alternative embodiment it may also be possible that the main processing device 192 and the main memory device 193 are only used to prepare or adapt data provided by means of the laser sensor module 100 such that the data can be presented to a user of the mobile communication device 190 by means of user interface 191.

The laser sensor module 100 may be powered by means of a power supply of the mobile communication device 190. The mobile communication device 190 further comprises a mechanical stimulator 194. The mechanical stimulator 194 is in this case a loudspeaker of the mobile communication device 190. The loudspeaker provides a mechanical excitation of the emission window at a predefined frequency (e.g. resonance frequency of the emission window). The main processing device 192 is arranged to determine a soiling of the emission window during mechanical excitation by means on an indication signal provided by the laser sensor module 100 as described above. The main processing device 192 is further arranged to calculate and to correct the particle density based on the indication signal or to initiate an error signal.

The same principle may be used in other devices comprising the laser sensor module 100. An air cleaner or ventilation hood may, for example, comprise the laser sensor module 100. The fan of, for example, the air cleaner may be used to (automatically) excite the emission window.

Figure 8:
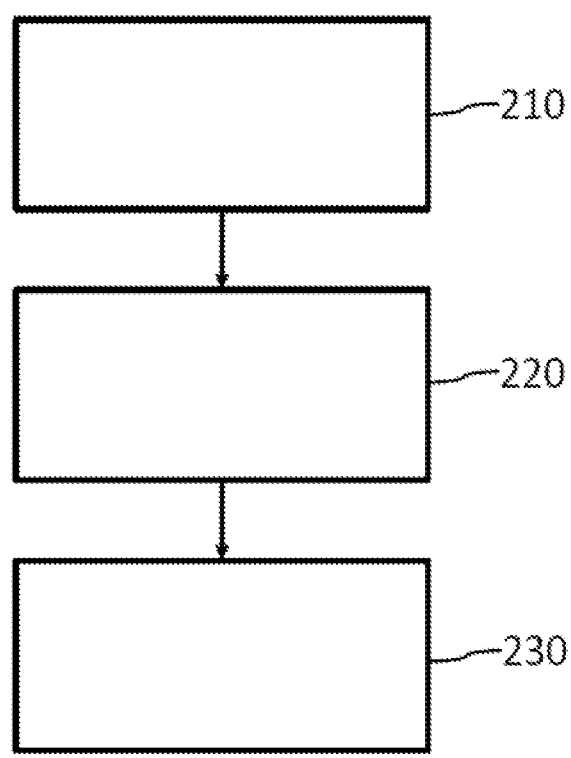
FIG. 8 shows a principal sketch of a method of testing a soiling of an emission window of a laser sensor module.

FIG. 8 shows a principal sketch of a method of testing a soiling of an emission window 145 of a laser sensor module 100. In step 210 a laser beam 112 is emitted through an emission window 145 to a focus region. In step 220 a mechanical excitation of the emission window 145 is provided during emission of the laser beam 112. An interference signal especially a self-mixing interference signal is determined in step 230 during mechanical excitation of the emission window 145.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Any reference signs in the claims should not be construed as limiting the scope thereof.

LIST OF REFERENCE NUMERALS 10 particle
50 dirt
61 time
62 signal amplitude [arbitrary units]
81 signal caused by white tape
83 signal caused by fingerprint
85 signal with cleaned window
87 signal without mechanical excitation
100 laser sensor module
111 laser
112 laser beam
117 scattered laser light
121 detector
130 electrical driver
135 interface
140 optical arrangement
141 optical device
145 emission window
150 evaluator
160 mechanical stimulator
190 mobile communication device
191 user interface
192 main processing device
193 main memory device
194 mechanical stimulator
210 step of emitting laser light
220 step of exciting emission window
230 step of determining self-mixing interference signal

The invention claimed is:

1. A laser sensor module for measuring a particle density of particles with a size of less than 20 pm, the laser sensor module comprising:
a laser configured to emit a laser beam;
a detector;
an optical arrangement, the optical arrangement configured to focus the laser beam to a focus region; and
an evaluator,
wherein the laser is configured to emit the laser beam through the optical arrangement to the focus region,
wherein the optical arrangement comprises an emission window,
wherein the detector is configured to determine an interference signal of an interference of reflected laser light with emitted laser light of the laser beam,
wherein the laser sensor module comprises a mechanical stimulator, and
wherein the mechanical stimulator is configured to vibrate the emission window to move the emission window with respect to the laser to cause path length variations of the reflected laser light, and
wherein the detector is configured to determine the interference signal based upon the interference of the reflected laser light with the emitted laser light of the laser beam detected during the vibration of the emission window, and
wherein the evaluator is configured to provide an indication signal of a soiling of the emission window based on the interference signal determined during the mechanical excitation of the emission window.

2. The laser sensor module according to claim 1,
wherein the interference signal is a self-mixing interference signal,
wherein the evaluator is configured to determine the soiling of the emission window based on the self-mixing interference signal determined during the mechanical excitation of the emission window, and
wherein the evaluator is configured to generate the indication signal of the soiling of the emission window after determining the soiling of the emission window.

3. The laser sensor module according to claim 1, wherein the indication signal provides a determination of a quantitative measure of the soiling.

4. The laser sensor module according to claim 3, wherein the evaluator is configured to correct a measured particle density based on the determined quantitative measure of the soiling.

5. The laser sensor module according to claim 1,
wherein the mechanical stimulator is configured to mechanically excite the emission window upon reception of an excitation control signal.

6. A device comprising the laser sensor module according to claim 1, wherein the device comprises an indicator, wherein the indicator is arranged to provide an indication of the soiling to a user of the device based on the indication signal.

7. The device according to claim 6, wherein the device is configured to initiate the mechanical excitation of the emission window.

8. The device according to claim 6, wherein the evaluator is configured to determine the soiling of the emission window based on the interference signal determined during the mechanical excitation of the emission window.

9. The device according to claim 6, wherein the evaluator is configured to present a corrected particle density based on the indication signal.

10. The device according to claim 9,
wherein the evaluator is configured to determine a quantitative measure of soiling based on the indication signal, and
wherein the evaluator is configured to correct a measured particle density based on the determined quantitative measure of the soiling.

11. The device according to claim 6, wherein the device is configured to initiate the mechanical excitation of the emission window by the mechanical stimulator, and wherein the device is configured to receive the interference signal determined during the mechanical excitation of the emission window from the laser sensor module.

12. The device according to claim 6, wherein the device is a mobile communication device.

13. The laser sensor module according to claim 1, wherein the mechanical excitation of the emission window comprises a vibration of the emission window, and wherein the evaluator is configured to provide the indication signal of the soiling of the emission window based on the interference signal determined during the vibration of the emission window.

14. A method of testing a soiling of an emission window of a laser sensor module for measuring a particle density of particles with a size of less than 20 pm, the method comprising:

emitting, with a laser, a laser beam through an emission window to a focus region, wherein the emission window focuses the laser beam to the focus region, mechanically exciting, with a mechanical stimulator, the emission window during emission of the laser beam, determining, with a detector, an interference signal of an interference of reflected laser light with emitted laser light during mechanical excitation of the emission window, and providing, with an evaluator, an indication signal of a soiling of the emission window based on the interference signal determined during the mechanical excitation of the emission window wherein the mechanical stimulator is configured to vibrate the emission window to move the emission window with respect to the laser to cause path length variations of the reflected laser light, and wherein the detector is configured to determine the interference signal based upon the interference of the reflected laser light with the emitted laser light of the laser beam detected during the vibration of the emission window.

15. A computer readable medium comprising instructions, which when executed by the laser sensor module, cause the laser sensor module to execute the method of claim 14.

* * * * *